May 21, 1963        D. H. BROWN        3,090,565
ANTI-SPLASH OUTLET CONDUIT
Filed Oct. 23, 1961

INVENTOR.
DALE H. BROWN
BY
HIS ATTORNEY

United States Patent Office 3,090,565
Patented May 21, 1963

3,090,565
ANTI-SPLASH OUTLET CONDUIT
Dale H. Brown, Scotia, N.Y., assignor to General Electric Company, a corporation of New York
Filed Oct. 23, 1961, Ser. No. 146,839
1 Claim. (Cl. 239—542)

This invention relates to outlet conduits of the type which are intended to provide an outlet flow of water which tends not to splash, and more particularly it relates to such an outlet conduit of the type through which a substantial amount of solid material is required to pass.

There are certain applications where an outlet conduit is not only required to provide a non-splashing outlet flow but also, because it must pass a substantial amount of solid matter, the conventional type of screening placed across the outlet cannot be used since it would very rapidly clog up with the solid matter. Such outlet conduits are an important factor in the use of present-day portable dishwashers; in this connection, such dishwashers necessarily operate by discharging their outlet flow into a sink. Since an important commercial aspect of dishwashers is that it not be necessary to remove all food particles from dishes before inserting them into the dishwasher, these food particles necessarily pass out through the drain of the dishwasher and into the sink with the water when it is drained from the dishwasher.

It is important that the water so discharged should not splash up from the bottom of the sink since it may then get the floor and the adjoining counter space around the sink wet. On the other hand a conventional screen-type, anti-splash device cannot be used since such devices are normally placed across the oulet, and if this were done the solid particles in the outlet flow would very promptly plug it up.

For this reason, it is an object of my invention to provide an outlet conduit in which the energy of the liquid being pumped out through the conduit is modified so that splashing is eliminated, while at the same time an unimpeded continuous passageway is provided for the removal of solid particles.

Briefly stated, in one aspect of my invention, I provide a liquid outlet conduit which includes, in the usual manner, lengthwise spaced inlet and outlet openings with the outlet opening being positioned to discharge in a generally downward direction. Within the conduit, I place a foraminous member which extends generally lengthwise therein and is positioned relative to the inlet opening so that most of the liquid passing into the conduit impinges on the member. The member is, however, positioned in spaced relation to the inlet opening and is further shaped so as to provide a continuous unimpeded passage through the conduit from the inlet opening to the outlet opening. In this manner, the impingement of the liquid on the foraminous member causes the dissipation of energy necessary to elimination of splashing; at the same time, the continuous passage from the inlet to the outlet which is provided permits food particles to either pass directly through the passage or, if they should remain on the member, to be washed along the member until they finally fall off it and pass out of the conduit.

The subject matter which I regard as my invention is particularly pointed out and distinctly claimed in the concluding portion of this specification. My invention, however, together with further objects and advantages thereof may best be understood by reference to the following description taken in conjunction with the accompanying drawing.

Figure 1:
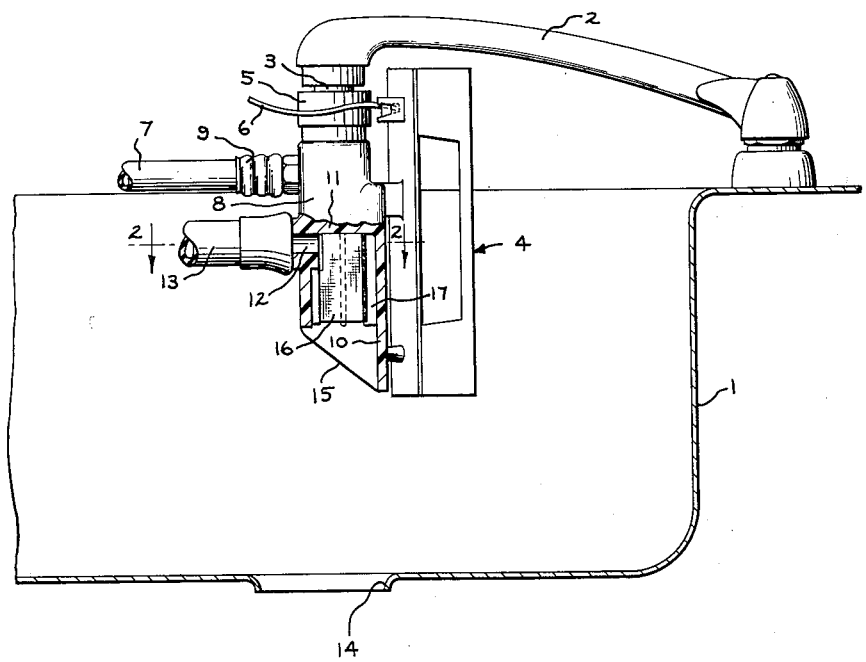
FIGURE 1 is an elevational view, partly in section, of an outlet conduit of the type incorporating my invention, included in a faucet connector adapted to be secured to a faucet.

Referring to the drawing, my invention is shown, for purposes of illustration, in connection with a kitchen sink 1 equipped with a faucet assembly 2 having a generally downwardly extending outlet portion 3. An assembly, generally indicated by the numeral 4, which normally forms a part of a portable dishwasher and extends therefrom may be secured to the faucet outlet 3 by means of an upper portion 5 which fits over outlet 3 and securely grips the outlet in watertight relation so that water passing through faucet 2 passes into the upper part of the assembly 4 without leakage between outlet 3 and part 5. This may readily be accomplished by a manually operable member 6 which, when depressed, permits cylindrical part 5 to be easily slipped over outlet 3 and when released causes the part 5 to clamp over outlet 3 in watertight relation therewith. This structure forms no part of my invention, and is therefore not further described, being well known to those skilled in the art.

When water is allowed to pass through faucet 2, it passes from outlet 3 into cylindrical part 5 of assembly 4, and then passes into an inlet hose 7 secured to the body 8 of the assembly 4 by any conventional means such as a clamp 9. It will be understood that this is a conventional structure which, while it is included in the same physical assembly as my invention in conventional practice and is therefore described, does not form a part of my invention.

The assembly 4 further includes an outlet conduit portion 10, a molded wall 11 providing a complete separation between outlet conduit 10 and the inlet connection for the dishwasher which passes from faucet 2 to hose 7. It will be understood at this point that the main body part 8 of the assembly 4 may be formed of a molded plastic if so desired, although this is not a feature of the invention. Near the upper end of the conduit 10, an inlet opening 12 is provided which connects with a discharge hose 13 extending to the dishwasher. It will thus be understood that when the dishwasher automatic control calls for liquid, liquid is passed from faucet 2 through hose 7 to the dishwasher, and conversely, when the dishwasher control requires draining of liquid, the liquid is passed from the dishwasher out through conduit 13 and then out through the discharge conduit 10 into the sink 1 so that it then passes down through the conventional opening 14 of the sink to the sewer or septic tank system.

Figure 2:
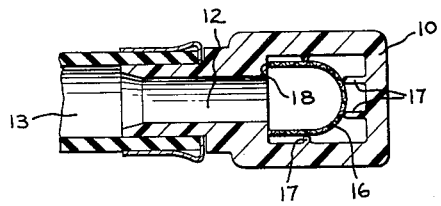
FIGURE 2 is a view along line 2—2 in FIGURE 1.
Figure 3:
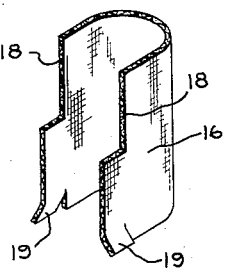
FIGURE 3 is an enlarged view in perspective of the foraminous member which forms an important part of my invention.

When the liquid passes through hose 13 and inlet 12 into conduit 10, it then leaves conduit 10 through the outlet 15 which is conventionally provided therein and which provides for a generally downward discharge of the liquid. Conduit 10 is generally rectangular in cross section, as can best be seen in FIGURE 2, and within this conduit there is positioned a foraminous member 16. While member 16 may be of any desired construction, a closely perforated sheet of metal represents the preferred arrangement, although conventional screening may also be used. Member 16 is bent into a substantially U-shaped configuration, as best seen in FIGURES 2 and 3, and is positioned witin conduit 10 so that the open top of the U faces the inlet 12. Thus, the member 16 is in effect spaced from the inlet, defining therewith an enclosed downwardly extending open ended channel within conduit 10.

In addition, suitable molded projections 17 are preferably provided extending inwardly from the inner surfaces of conduit 10 so as to position the member 16 in spaced relation to the inner walls of the conduit. The member 16 is thus positioned within the outlet conduit 10 so that it is in spaced relation with the inlet opening 12, and also in spaced relation to the inner wall of the conduit. Of course, the member 16 may be appropriately shaped with cut-away sections 18 so as to accommodate the inner shape of the conduit 10 where it has a projecting portion provided for the inlet 12. In addition, two of the ends of member 16 may be formed as tabs 19 so as to extend into frictional engagement with the walls of conduit 10 and help secure the member 16 therewithin by frictional engagement.

When liquid is pumped through hose 13 and inlet 12 into the outlet conduit 10, the positioning of foraminous member 16 causes virtually all of this liquid to impinge on the member. When the water stream impinges on member 16, it breaks up and partially passes through the openings, giving up a substantial amount of its energy as it does so. As a result, the water stream then falls relatively gently into the sink 1 without splashing. As mentioned above, it is anticipated that a substantial quantity of solid particles are carried along with the liquid stream into the outlet 10. These solid particles have a clear path from the inlet 12 to the outlet 15 of outlet conduit 10 through which they may pass without any interference. While they will generally impinge on member 16, since they are in the stream that impinges on the member, most of these particles will fall off the screen and will pass directly out through outlet 15. While a few particles will tend to adhere to the member 16, the direction of water flow always tends to wash these particles toward the outlet so that eventually all particles are washed off the foraminous member 16 and out of the conduit 10.

In this manner, the desired absorption of energy from the drain stream is effected so as to prevent splashing while at the same time a clear unimpeded passage is provided for relatively large food particles so that they will not clog the member 16 and cause malfunctioning of the apparatus.

While a structure has been shown wherein the outlet conduit structure 10 is part of an assembly secured to faucet 2, it will readily be understood that the outlet conduit 10 may be entirely independent of the water-introducing apparatus, and thus may be secured independently as, for instance, to the side of a sink rather than to a faucet.

It will thus be understood that while I have shown and described a particular embodiment of my invention, I do not desire the invention to be limited to the particular construction disclosed, and I intend by the appended claim to cover all modifications within the true spirit and scope of my invention.

What I claim as new and desire to secure by Letters Patent of the United States is:

A generally vertically extending liquid outlet conduit including an upper inlet opening and a lower outlet opening, said inlet opening being formed in the side of said conduit and said outlet opening extending from the bottom of said conduit, and a U-shaped foraminous member positioned in said conduit with the open side of said U facing said inlet opening and defining with said inlet opening an enclosed open ended channel within said conduit, said conduit having projections extending inwardly from its inner surfaces against said foraminous member whereby said foraminous member is held in spaced relation to the inner surfaces of said conduit, said foraminous member being positioned relative to said inlet opening so that most of the liquid passing from said inlet opening impinges on said member, the positioning of said foraminous member with the open side of said U facing said inlet opening providing an unimpeded passage through said conduit from said inlet opening to said outlet opening.

References Cited in the file of this patent

UNITED STATES PATENTS 3,001,771     Pro _____ Sept. 26, 1961

FOREIGN PATENTS 921,799     Germany _____ Oct. 13, 1955